H. ALEXANDER.
SYSTEM OF MOTOR CONTROL.
APPLICATION FILED MAY 20, 1907.

901,514.

Patented Oct. 20, 1908.

2 SHEETS—SHEET 1.

Witnesses
J. Ellis Glen.
J. Earl Ryan

Inventor.
Hans Alexander.
by Alexander Davis
Atty.

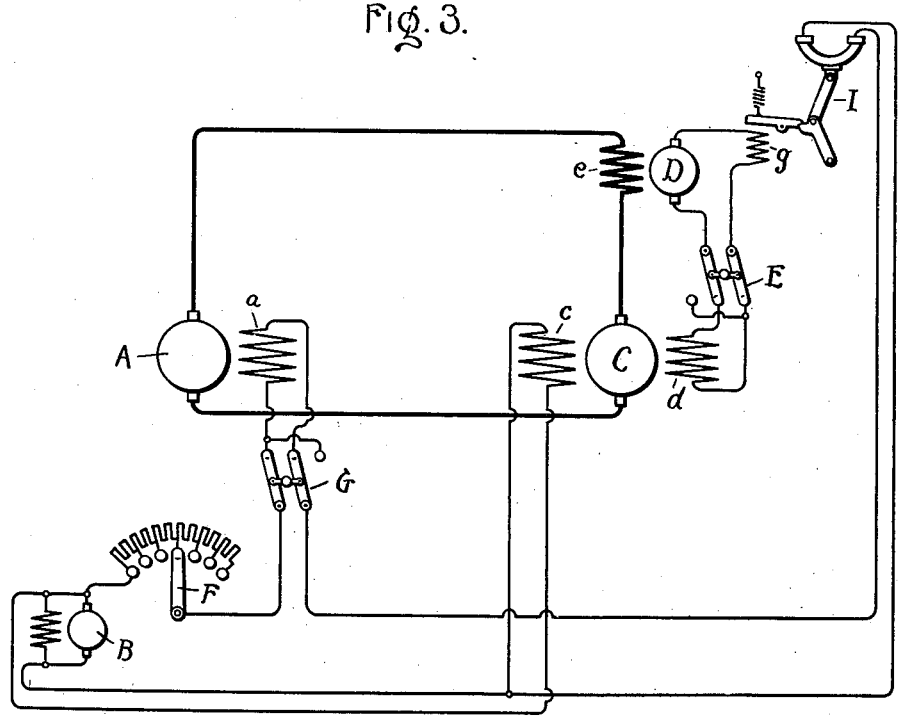

UNITED STATES PATENT OFFICE

HANS ALEXANDER, OF BERLIN, GERMANY, ASSIGNOR TO GENERAL ELECTRIC COMPANY, A CORPORATION OF NEW YORK.

SYSTEM OF MOTOR CONTROL.

No. 901,514.　　　　Specification of Letters Patent.　　　Patented Oct. 20, 1908.

Application filed May 20, 1907. Serial No. 374,674.

*To all whom it may concern:*

Be it known that I, HANS ALEXANDER, a subject of the King of Prussia, residing at Berlin, Germany, have invented certain new and useful Improvements in Systems of Motor Control, of which the following is a specification.

My invention relates to motor control systems, and more particularly to systems of control of electrically driven rolling mill motors, or like motors, which are subject to heavy overloads and must be frequently reversed.

The system most frequently used for rolling mill motors or the like comprises the speed control of a direct-current motor with a constant field excitation by varying the voltage of a separately excited generator supplying the motor armature. Since rolling mills are liable to severe overloads, it has been found necessary to limit the current output of such generators. This has been accomplished by means of a differential compounding field winding on the generator, or by the use of a cumulative compound motor. The use of series or compound motors has the further advantage that their starting torque is large. When a motor having a field winding in series with the line is used, it is necessary to reverse the direction of current through this field winding with respect to the armature upon every reversal of the rolling mill, and when the machine is of large size, a very heavy switch must be provided.

It is the object of my invention to avoid the use of such a switch. To this end I provide an auxiliary field winding on the motor, supplied with current from a series-exciter driven by any suitable means, but having its field winding in series with the line through which the current flows supplying the motor, whereby the current flowing through the auxiliary field winding is proportional to the main line current.

Other features of novelty which characterize my invention will be pointed out with particularity in the claims annexed to and forming a part of this specification.

Figure 1:
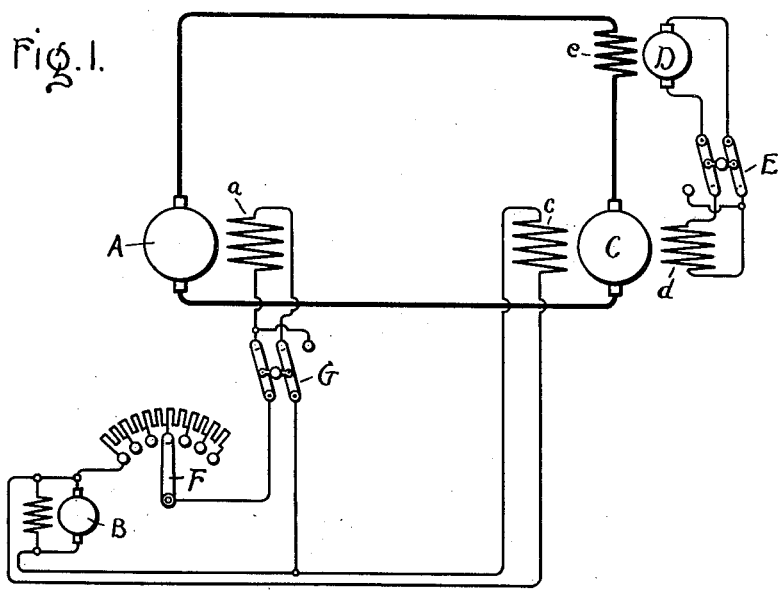
Figure 2:
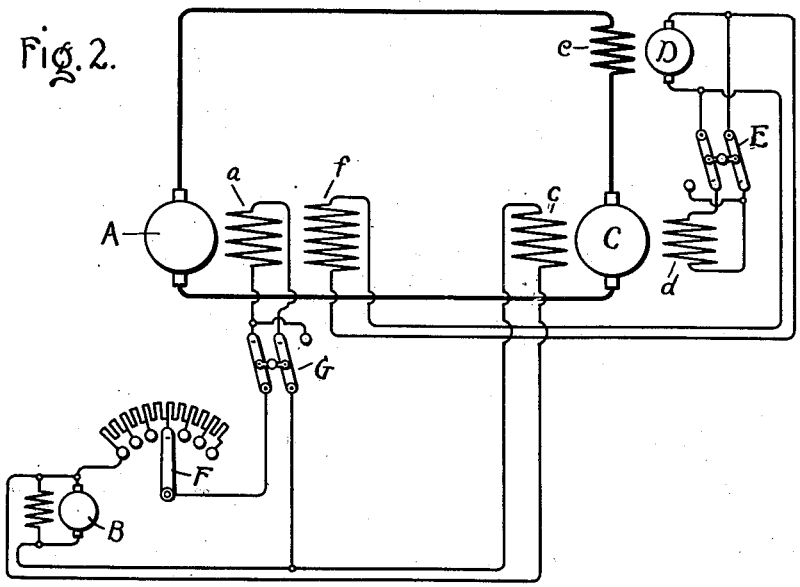

For a better understanding of my invention, however, and other advantages possessed by it, reference may be had to the following description taken in connection with the accompanying drawing in which Figure 1 shows diagrammatically a control system in accordance with my invention, in which a separately excited generator supplies a motor having main and auxiliary field windings, the auxiliary winding being cumulatively compounding and excited by a series-exciter, the field of which is in series with the motor armature; Fig. 2 shows a similar system in which a differentially compounding winding on the generator is also supplied with current from the series-exciter, and Fig. 3 shows a system similar to Fig. 1 except that an automatic cut-out in the main field circuit of the generator has its electromagnetic coil arranged in the armature circuit of the series-exciter.

In the figures of the drawing A represents the armature, and $a$ the field of the separately excited generator. This generator may be the generator of a fly-wheel motor-generator set.

B represents a separate exciter which may consist of any suitable source of current, for instance, of a small generator, as shown, suitably driven.

C represents the armature of the motor supplied with current from the armature A of the generator, and $c$ represents the main field winding of the motor supplied with constant excitation from the exciter B.

D is a series-exciter connected to the auxiliary field $d$ of the motor C through a reversing switch E. The field winding $e$ of the series-exciter D is in series with the armatures A and C of the motor and generator.

F represents a control switch which is arranged to connect the generator field winding $a$ to the exciter B and to vary the current supplied to the generator field winding.

G is a reversing switch connected between the field winding $a$ of the generator and the exciter B so that the current through the field may be reversed.

Referring particularly to Fig. 1, with the circuit arrangement as shown, the armature of the generator A supplies current to the armature C of the motor, and the series-exciter D supplies current to the field winding $d$ of the motor in proportion to the current flowing in the main circuit. If this exciter is designed to work low on its saturation curve its voltage, and consequently the current in the field winding $d$ of the motor, will always be in proportion to the current in the main circuit so that the field winding $d$ will act as a cumulative compounding winding through which the motor armature current flows. By moving the handle of the regulator F so as to cut out more of the resistance of the rheostat, greater voltage is supplied to the winding $a$ of the generator, and consequently the generator will operate at a greater voltage and will supply more current to the motor armature. When it is desired to reverse the motor C the handle of the rheostat is moved to the "off" position, which is at the extreme right, and the reversing switches E and G are thrown over. From this it will be seen that the armature current of the motor is reversed, while the motor field windings $c$ and $d$ are excited in the same direction as before without the use of a switch in the armature circuit of the motor, but by means of a switch in the armature circuit of the exciter D, so that by building the machine D for a high voltage it is possible to reverse the compounding field winding of the motor, even where this motor is very large, by moving a comparatively light switch. In a large installation the series field winding, in case an ordinary series or compound wound motor is used, would have to be of very large dimensions and of very low resistance, and hence it would be difficult to make use of any of the ordinary methods of field regulation in such a motor. By the use of such a system as I have proposed this regulation may be obtained in the armature circuit of the exciter D, in which only a small current flows.

Referring now to Fig. 2 it will be noted that the generator has a field winding $f$ which is arranged to be excited so as to partially counteract the action of the field winding $a$. This winding $f$ is arranged to be supplied with current from the series-exciter D. The winding $f$ does not need to be reversed upon the reversal of the direction of rotation of the motor C, because upon the reversal of the field winding $a$ the current flowing through the field winding $e$ of the series-exciter is reversed thereby reversing the current flowing from the armature D, since it rotates in the same direction, and consequently, the current through the winding $f$ is also reversed with the current through the winding $a$. In the system as illustrated in Fig. 2, upon a severe overload of the motor C the winding $d$ tends to reduce the speed of the motor and the winding $f$ of the generator tends to reduce the generator voltage. The action of these two fields together tends to decrease the current supplied the motor C and consequently relieves the heavy overload on the generator.

Fig. 3 is similar to Fig. 1 except that an automatic cut-out I is in series with the exciter B and the field circuit $a$ of the generator. The electromagnetic coil $g$ of this cut-out is in series with the armature D of the separate exciter so that in case of a severe overload on the motor C the current flowing through the exciter armature D being in proportion thereto, the coil $g$ will be energized and will operate the cut-out I, thus opening the field circuit of the generator and stopping the supply of current to the motor armature C. This cut-out may operate to cut in a resistance in the field circuit $a$ instead of opening the circuit completely. By the use of a cut-out, as shown in this figure, a great advantage is obtained because the coil of the cut-out is here arranged to be actuated by a very small current. A similar cut-out may also be used in connection with the system as shown in Fig. 2.

While I have shown the field winding $e$ of the series exciter D as being connected so that the entire current of the armatures A and C of the motor and generator flow therethrough, it is obvious that it might be so connected to the supply lines of the motor that instead of carrying the entire current it would carry a current proportional to that in the supply lines, and I aim in the claims, hereto appended, to cover such a modification as well as any other modifications of my system that do not involve a departure from the spirit and scope of my invention.

What I claim as new and desire to secure by Letters Patent of the United States, is,—

1. In combination, a separately excited generator supplying a motor, means for controlling the field strength of the generator to vary the voltage supplied to said motor, a separately excited field winding on said motor, a series-exciter connected to said field winding, and a field winding on said exciter in series with the supply lines of the motor.

2. In a system of control for reversible motors, a motor having a series field winding, a variable voltage dynamo supplying the motor, and a series-exciter having a field winding connected in the main circuit, the series field winding of the motor being connected to the said exciter and being provided with a reversing switch.

3. In combination, a separately excited generator supplying a separately excited motor having main and auxiliary windings, means for controlling the field strength of the generator to vary the voltage supplied to said motor, and an exciter connected to said auxiliary field winding and having a field winding in series with the supply lines of the motor.

4. In combination, a separately excited generator supplying a separately excited motor having main and auxiliary windings, means for controlling the field strength of the generator to vary the voltage supplied to said motor, and a series exciter having a field winding connected in the main circuit, the auxiliary field winding of the motor being connected to said exciter and being provided with a reversing switch.

5. In combination, a separately excited generator supplying a motor, means for controlling the field strength of the generator to vary the voltage supplied to said motor, a separately excited field winding on said motor, and a series-exciter connected to said field winding and having a field winding in series with the supply lines of the motor, said exciter being so constructed and designed that the current flowing in said motor field winding is approximately proportional to the current supplied the motor at all loads.

6. In combination, a separately excited generator having main and differentially compounding field windings, said generator supplying a motor, means for controlling the field strength of said generator to vary the voltage supplied the motor, a field winding on said motor, a series exciter connected to the motor field winding and to said differentially compounding field winding, and a field winding on said exciter in series with the supply lines of the motor.

7. In combination, a separately excited generator having main and differentially compounding field windings, said generator supplying a motor, means for controlling the field strength of said generator to vary the voltage supplied the motor, a field winding on said motor, a series exciter having a field winding connected in the main circuit, said exciter being connected to the differentially compounding field winding of the generator and to the field winding of the motor, and a reversing switch in the field winding circuit of the motor.

8. In combination a separately excited generator having main and differentially compounding field windings, said generator supplying a separately excited motor having main and auxiliary field winding, means for controlling the field strength of said generator to vary the voltage supplied the motor, a series-exciter connected to said auxiliary field winding and to said generator's differentially compounding field winding, and a field winding on said exciter in series with the supply lines of the motor.

9. In combination, a separately excited generator having main and differentially compounding field windings, said generator supplying a motor having main and auxiliary field windings, means for controlling the field strength of said generator to vary the voltage supplied the motor, an exciter connected to said auxiliary winding and to said differentially compounding winding, a field winding on said exciter in series with the supply lines of the motor, and reversing switches in the main field winding circuit of the generator and in the auxiliary field winding circuit of the motor.

10. In combination, a generator having a separately excited field supplying a motor, means for controlling the field strength of the generator to vary the voltage supplied to said motor, a field winding on said motor, a series exciter connected to said field winding of the motor and having a field winding in series with the supply line of the motor, and an automatic cut-out having its actuating coil arranged in the field circuit of said motor.

11. In combination, a generator having a separately excited field supplying a motor, means for controlling the field strength of the generator to vary the voltage supplied to said motor, a field winding on said motor, a series-exciter connected to said field winding of the motor and having a field winding in series with the supply lines of the motor, and an automatic cut-out having its actuating coil arranged in the field circuit of said motor, said cut-out being arranged to act on the separately excited field of the generator.

12. In combination, a generator having a separately excited field supplying a motor, said motor having main and auxiliary field windings, means for controlling the field strength of the generator to vary the voltage supplied to said motor, a series-exciter having a field winding connected in the main circuit, the auxiliary field winding of the motor being connected to said exciter and being provided with a reversing switch, and an automatic cut-out having its actuating coil arranged to be operated by a current supplied by said exciter.

13. In combination, a generator having a separately excited field supplying a motor, said motor having main and auxiliary field windings, means for controlling the field strength of the generator to vary the voltage supplied to said motor, an exciter connected to said auxiliary field winding and having a field winding in series with the supply lines of the motor, and an automatic cut-out having its actuating coil arranged to be operated by the current supplied by said exciter, said cut-out being arranged to act on the separately excited field of the generator.

In witness whereof I have hereunto set my hand this 7th day of May, 1907.

HANS ALEXANDER.

Witnesses:
　JULIUS RUMLAND,
　FERDINAND RORB.